United States Patent

Bryant et al.

Patent Number: 5,478,184
Date of Patent: Dec. 26, 1995

[54] CONVEYOR SYSTEM FOR ROD-LIKE ARTICLES

[75] Inventors: Leonard J. Bryant; Peter A. Clarke, both of High Wycombe; Wilfred B. Heginbotham, Beeston; Keith K. Martin; James McLeod, both of High Wycombe, all of England

[73] Assignee: Molins Machine Company, Inc., Richmond, Va.

[21] Appl. No.: 979,339

[22] Filed: Nov. 20, 1992

Related U.S. Application Data

[62] Division of Ser. No. 475,987, Feb. 6, 1990, Pat. No. 5,190,428, which is a continuation of Ser. No. 19,211, Feb. 25, 1987, abandoned.

[30] Foreign Application Priority Data

| Feb. 25, 1986 | [GB] | United Kingdom | 8604663 |
| Apr. 10, 1986 | [GB] | United Kingdom | 8608739 |
| Sep. 3, 1986  | [GB] | United Kingdom | 8621267 |

[51] Int. Cl.⁶ .................................................. B05G 1/18
[52] U.S. Cl. .......................... 414/331; 414/399; 198/347.1; 198/349
[58] Field of Search .................... 198/349, 350, 198/347.1, 358; 414/331, 399, 403; 901/16

[56] References Cited

U.S. PATENT DOCUMENTS

| 3,486,604 | 12/1969 | Molins | 198/349 |
| 3,536,182 | 10/1970 | Rehrig | 198/350 |
| 3,726,383 | 4/1973 | Bornfleth et al. | 198/358 |
| 3,774,791 | 11/1973 | Bornfleth | 414/403 |
| 3,883,017 | 5/1975 | Shirai | 414/424 |
| 4,229,137 | 10/1980 | Molins | 198/347.1 |
| 4,564,329 | 1/1986 | Bantien | 414/403 |
| 4,585,386 | 4/1986 | Gomann et al. | 198/347.1 |
| 4,597,707 | 7/1986 | Cornacchio | 901/16 |
| 4,747,743 | 5/1988 | Dowding et al. | 414/403 |
| 4,892,453 | 1/1990 | Bantien et al. | 414/403 |
| 4,917,559 | 4/1990 | van der Schoot | 414/331 |
| 5,092,730 | 3/1992 | Neri | 414/331 |

FOREIGN PATENT DOCUMENTS

| 0063400 | 10/1982 | European Pat. Off. . |
| 3318492A1 | 11/1984 | Germany . |
| 1486659 | 9/1977 | United Kingdom . |
| 1528014 | 10/1978 | United Kingdom . |

OTHER PUBLICATIONS

DE Journal Fordern und heben, 1985, No. 6, pp. 471–472.

*Primary Examiner*—Michael S. Huppert
*Assistant Examiner*—Gregory A. Morse
*Attorney, Agent, or Firm*—Antonelli, Terry, Stout & Kraus

[57] ABSTRACT

Containers for rod-like articles are provided with a device, e.g. a transponder, capable of carrying variable coded information. Read and write devices are provided at appropriate positions, e.g. tray fillers and unloaders, to ensure that only containers of the correct type and contents are passed for further processing. The coded information may also relate to time of manufacture or loading, particularly where the articles are filter rods, to ensure unloading of only those containers in which the rods have received adequate curing time. A buffer reservoir system having a tray filler, tray unloader, and a tray handling system includes a transfer member capable of transferring trays between different positions of the tray handling system and a static trolly. The transfer member may comprise a robotic or other programmable member.

22 Claims, 7 Drawing Sheets

CONVEYOR SYSTEM FOR ROD-LIKE ARTICLES

BACKGROUND OF THE INVENTION

This application is a division of our U.S. application Ser. No. 475,987, filed Feb. 6, 1990, now U.S. Pat. No. 5,190, 428, issued Mar. 2, 1993, which is a continuation of our U.S. application Ser. No. 019,211, filed Feb. 25, 1987, now abandoned.

This invention relates to a conveyor system for rod-like articles, particularly articles of the tobacco industry such as cigarettes or filter rods.

In the cigarette industry it is common to link a machine for producing rod-like articles, e.g. a cigarette making machine or filter rod making machine, to a receiving machine, e.g. a cigarette packing machine or filter rod pneumatic distribution system, by way of a conveyor system which includes a buffer reservoir for accommodating temporary differences in supply and demand. Such conveyor systems are known in which the buffer reservoir comprises means for loading and unloading containers. Examples of such systems are disclosed in British patent specifications Nos. 1404142 and 1557458. It is also known, for example from British patent specification No. 1404141, to convey containers in trolleys for transfer to or from the buffer reservoir.

British patent specifications Nos. 2142894, 2157252, 2157253 and 2171971 also relate to conveyor systems for rod-like articles which include or co-operate with container handling equipment intended to provide a buffer reservoir facility between an article delivery device and an article receiving device. The disclosures of said specifications are hereby incorporated herein in their entireties.

SUMMARY OF THE INVENTION

The present invention is particularly, but not exclusively, concerned with equipment for conveying containers for rod-like articles such as container loading and/or unloading machines and/or buffer reservoirs for containers.

According to one aspect of the invention a container conveying system comprises means for loading containers, means for unloading containers, means for coding a container according to its contents, and means for reading the code on a container before unloading it. The system may include means for sending an alarm or reject signal if the reading means detects an incorrect code or no code. The signal may be used to operate means for ejecting a container or for preventing unloading of the container. The code may include information other than relating to the contents of the container, e.g. container type, required delivery position, orientation, etc.

An erase head may be provided at or downstream of the means for unloading containers, so that empty containers are uncoded (except for any container type code or other variable not relating to contents). This allows flexbility in use of empty containers.

Means for reading codes may be located at other container conveying positions, e.g. at positions where containers may be delivered to a container conveying means other than at a container loading means. For example, in a buffer reservoir system including container conveying means linking container loading and unloading means it may be required to deliver articles to the system from an external source, and in that case the container delivery means may include means for reading the code of a container and be programmed not to allow delivery unless the code is acceptable. Such code reading means may be automatically programmed to accept containers bearing only the same code as is written at or adjacent a container loading means of the buffer reservoir system.

The code may be provided on a magnetic strip attached to each container in the same position. The read, write, and erase heads are in that case appropriate magnetic heads. Alternatively, the code may be provided by a transponder attached to each container, and in that case the heads comprise appropriate receiving or transmitting units. A central computer or the like may provide common coding information to each of the heads.

According to another aspect the invention provides a container conveying system, particularly for containers for rod-like articles of the tobacco industry, comprising at least one device for receiving coded information from a container or its contents, means for determining whether said information corresponds with predetermined information relating to container contents, and at least one container conveyor responsive to a control signal generated by or in response to a signal from said determining means. The device may comprise means for reading indicia carried by the container. The indicia may be stored electronically. At least one container may be provided for carrying a transponder for storing indicia. In that case the device may comprise a radio frequency receiver. Alternatively the indicia may be stored magnetically and the device may comprise appropriate reading means.

In general the system may comprise a container carrying means for storing variable information, and means for passing a signal to the storing means. The signal may be an interrogating signal which causes the storing means to release the information. The signal passing means may comprise means for passing a signal to the storing means to change the stored information. The signal passing means may be a radio frequency transmitter.

The stored information may relate directly to container contents. Alternatively the information may identify a container and the determining means may comprise processor means for linking coded information identifying a container with information relating to its contents.

The device for receiving coded information may be arranged to read the information directly from container contents. For this purpose the contents may consist of rod-like articles which are marked during manufacture with readable indicia, e.g. a bar code, preferably printed using organo-phosphor or other material not readily visible in ordinary light. The device should be of a type adapted to read the indicia.

According to a further aspect the invention provides a system for conveying containers for rod-like articles, including at least one container carrying an identifying means, said means identifying or being capable of identifying at least one parameter relating to or associated with said container, at least one system device capable of interaction with said identifying means, whereby an information carrying signal may be transferred between said means and said device, preferably when said means and said device are in reasonably close proximity, and at least one system conveyor responsive to a control signal generated in response to the nature of said information carrying signal.

The interaction between said identifying means and said system device preferably is or potentially is two-way, so that a container identifying means may receive signals from a system device and store information carried by the signals, e.g. the identifying means may comprise a magnetic strip or a transponder or similar device, and so that a system device (not necessarily the same device) may receive signals from, e.g. read, the information carried by the container identifying means.

The container identifying means may merely identify a particular container and/or its position, and this information may be linked to a system memory unit, e.g. in a microprocessor, which unit carries further information associated with the container and/or its contents. Alternatively, the identifying means may itself carry some of the further information and may be programmable, particularly where it comprises a magnetic strip or a transponder or similar device.

According to another aspect of the invention a container for rod-like articles is provided with means for storing readable information relating to the container and/or its contents, said storing means being arranged to respond to transmitted (e.g. radiated) signals to change the information stored. Preferably the storing means comprises means which is programmable or readable by an appropriate device associated with a system for conveying containers. The storing means may comprise a magnetic strip or a transponder. The container is preferably incorporated in a conveyor system including at least one device capable of changing said variable information and at least one device capable of responding to said information.

According to a further aspect of the invention a container conveying system includes first conveyor means for a container for rod-like articles, second conveyor means for a container for rod-like articles, and means for transferring a container between a plurality of positions of said first conveyor means to at least one position of said second conveyor means, the transferring means including a container engaging member movable to said positions. The container engaging member may be movable to a plurality of positions of said second conveyor means.

Preferably the container engaging member comprises container sensing means, and may comprise a robotic or other programmable member. In a preferred arrangement the transferring means includes means for moving the container engaging member so that any position in a particular space which is normally accessible by a container on said first or second conveyor means may be reached by the member. One convenient way of achieving this is to allow the member movement in directions at right angles in a horizontal plane and also to allow vertical movement to displace this plane upwards or downwards. Rotational movement of the member about one or more axes (e.g. horizontal and vertical) may also be provided. In this way the container engaging member may engage containers in any expected position, and the precise location of that position (within the total range of possible movement of the member) is not critical.

In a preferred arrangement the first conveyor means comprises a conveyance, e.g. a trolley, for a plurality of containers, and the second conveyor means comprises one or more endless band conveyors leading to or from a container loading and/or unloading station. The second conveyor means may further include subsidiary delivery or receiving conveyors associated with said endless band conveyors. Thus, the conveyance may be located in a convenient stationary position adjacent the container loading and/or unloading station, and the transferring means used to transfer containers, which may be empty or full, between the conveyance and the endless band conveyors. The transferring means moves along the conveyance to detect and remove a container and transfer it to an appropriate place on the second conveyor means (either directly or to a subsidiary delivery conveyor). Conversely, movement from the second conveyor means to the conveyance is performed in a similar manner. One way in which the transferring means may detect a container (and distinguish between, for example, a correctly filled container and an empty container) is if the containers carry means for storing variable information as described above; the transferring means is then provided with appropriate reading means.

In one preferred arrangement the second conveyor means comprises first and second band conveyors linking container loading and container unloading means and said first conveyor means comprises a trolley located adjacent to and parallel to said first and second band conveyors. The transferring means may comprise a gantry or similar system including a plurality of motor/control units movable relative to a stationary part of the gantry system and imposing on the container engaging member the required degrees of movement. Thus, the gantry system may include beams or other guides extending in three directions at right angles to one another and the mounting of the container engaging member may include provision for rotational movement about vertical and horizontal axes, thereby providing for access to any expected container position.

The container transferring means may incorporate means for reading a code on a container. Thus, the container engaging means may carry code sensing means. Preferably the code sensing means is automatically programmed so that the transferring means transfers only those containers bearing the correct code e.g. no code for empty containers. The code sensing means is a convenient way of allowing the transferring means to distinguish between empty and full containers and to check the orientation of the container. When the transferring means detects an unacceptable container code it may be arranged to move that container to a position where it may be inspected and/or removed by an operator, e.g. an incorrectly coded tray may be placed on the floor adjacent a trolley in a system where the transferring means is transferring trays between a tray buffer reservoir and a trolley. The code position may also be of use in alignment of the container engaging member, e.g. so that a gripper arm of a robotic member grasps a container in a correct position.

According to a still further aspect of the invention a conveying system for rod-like articles of the tobacco industry comprises an article delivery device, an article receiving device, first conveyor means for conveying articles from the article delivery device to a container loading station, second conveyor means for conveying articles from a container unloading station to the article receiving device, container conveying means for conveying containers containing articles from said loading station to said unloading station, and control means for determining the conveyance rate of said container conveying means, whereby articles pass from said delivery device to said receiving device in a predetermined mimimum time. In a preferred arrangement the article delivery device is a filter rod making machine and the article receiving device is a pneumatic filter rod distribution unit. The container loading and unloading devices may respectively comprise tray filling and unloading units, and may form part of a system similar to that of Molins MATCH.

The control means, which preferably comprises a programmable unit such as a microprocessor, may include means for delaying passage of containers, where necessary, to ensure a minimum elapsed time between manufacture and delivery. For example, the microprocessor could monitor the movement of containers through known locations in association with a generated time signal to ensure the predetermined minimum elapsed time. The container loading station may include a write unit forming part of said control means for coding each container as it is filled with a time or other code related to the time of manufacture or loading of the filter rods contained in the container. The container unloading station may correspondingly have a read unit arranged to read the codes on successive containers and to generate a pass signal only if the code read indicates that sufficient time has elapsed since such manufacture or loading. The read unit may therefore include or be linked to means for comparing a code carried by a container with a current time signal. The control means may further include means for delaying a container until an acceptable result of said comparison is acheived.

The control means may be programmable so that an acceptable delay can be stored in memory. The write unit may code each container with information additional to the time of loading or manufacture of its contents. For example, each tray may carry a code indicating the brand or type of its contents; the read unit is then programmed to accept only the correct brand or type, so that accidental mixing of brands or types can be avoided. Thus, the control means may embody the other aspects of the present invention relating to control of passage of containers according to information carried by or stored in relation to the containers.

In a preferred arrangement the container conveying means may include means for storing and conveying containers at a rate appropriate to said predetermined mimimum time, and means for storing and conveying additional containers. Thus said container conveying means is capable of providing a so-called delay line and has additional capacity for providing a reservoir for articles in containers when required. In this way if the rate of the article delivery device exceeds that of article receiving device articles may be progressively stored in the container reservoir, until the latter is full. Conversely, if the rate of the article receiving device exceeds that of the article delivery device the number of containers in the delay line is reduced, the control means ensuring that each container is delayed sufficiently before it is unloaded and its contents passed to the delivery device.

BRIEF DESCRIPTION OF THE DRAWINGS

The invention will be further described, by way of example only, with reference to the accompanying diagrammatic drawings, in which.

DETAILED DESCRIPTION OF THE PREFERRED EMBODIMENTS

Figure 1:
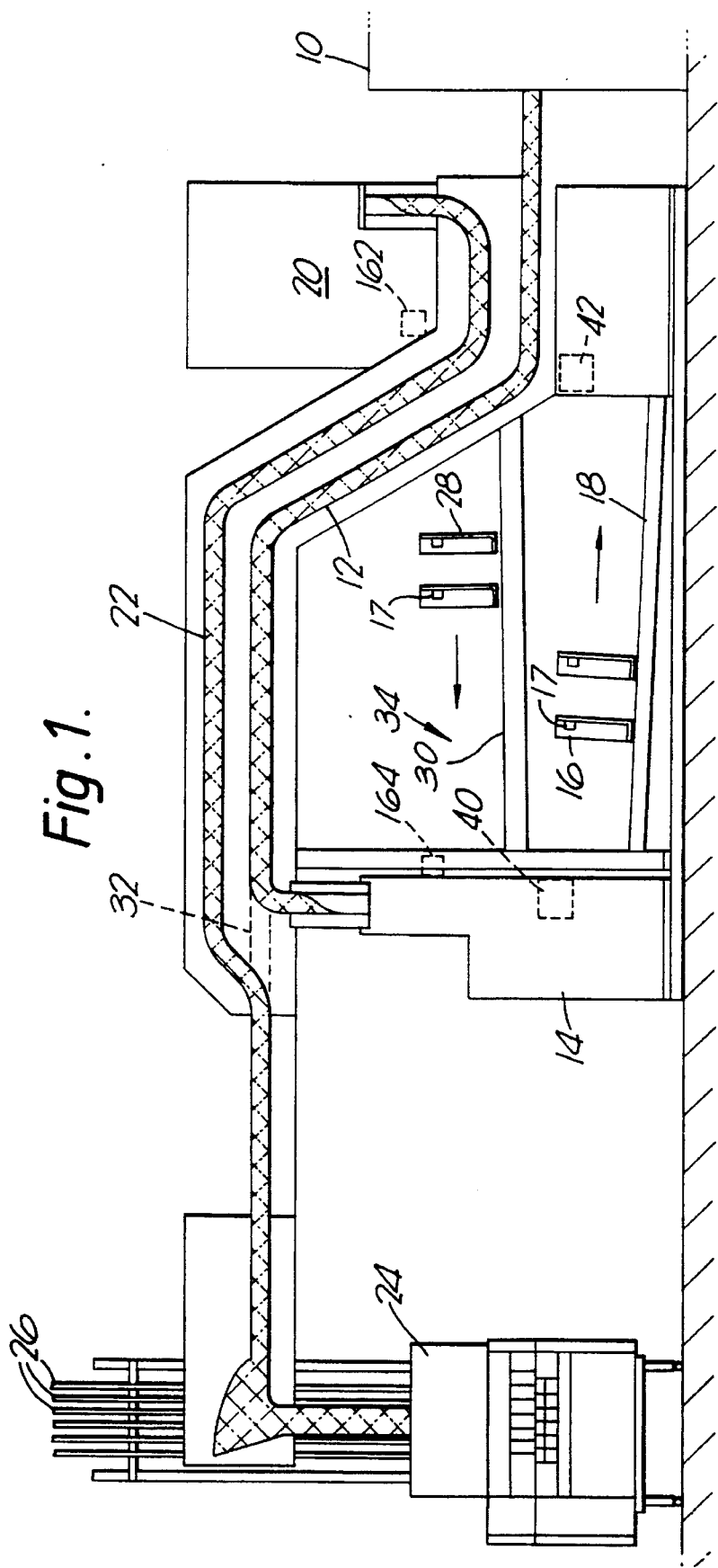
FIG. 1 is a side view of a conveyor system for filter rods.
Figure 2:
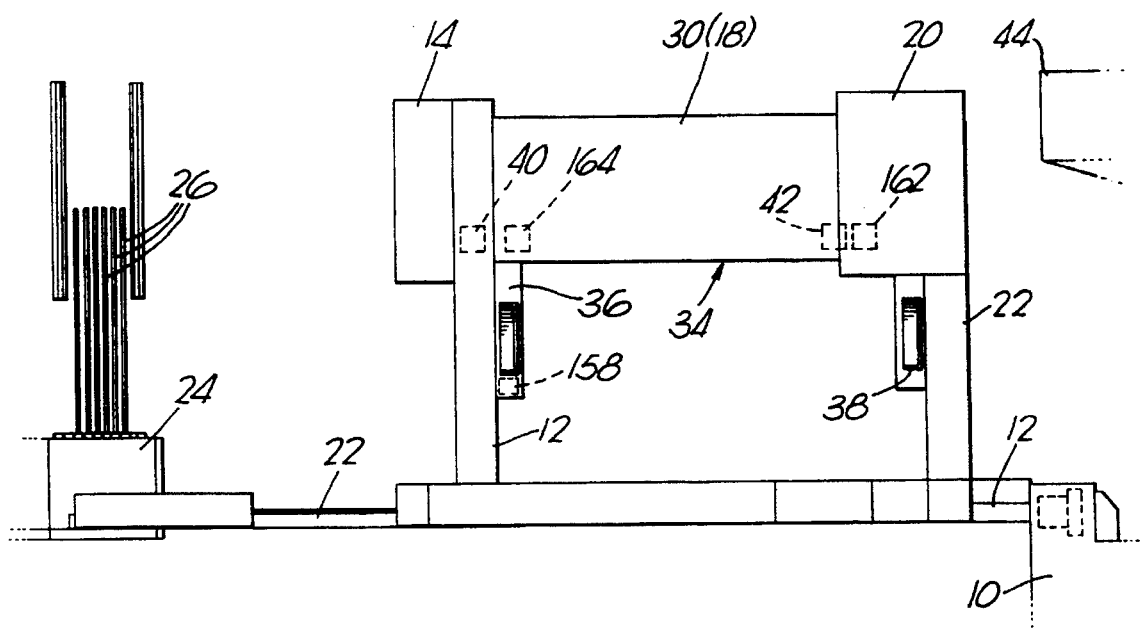
FIG. 2 is a plan view of the system of FIG. 1.

In the system of FIGS. 1 and 2 filter rods produced by a filter rod making machine 10 are conveyed in multi-layer stack formation along a first conveyor path 12 to a tray filling machine 14 in which all filter rods received from the path 12 are loaded into trays 16. Filled trays 16 are conveyed along a full tray conveyor 18 to a tray unloader 20 at which successive trays are unloaded and their contents delivered to a second conveyor path 22. The path 22 conveys the unloaded filter rods from the tray unloader 20 to a filter rod pneumatic distribution unit 24 from which the filter rods are pneumatically conveyed along pipes 26 to filter cigarette assembling machines (not shown). Empty trays 28 are returned to the tray filler 14 from the tray unloader 20 along an empty tray conveyor 30.

The tray filler 14 and tray unloader 20 and the tray conveyors 18 and 30 constitute a unit 34 which is basically similar to the buffer reservoirs of the systems described in the above-mentioned British patent specification No. 2171971. Note, however, that there is no direct conveyor path for rod-like articles in multi-layer stack formation between the paths 12 and 22, i.e. the section of conveyor indicated in dotted lines at 32 in FIG. 1 which is present in systems in which the unit 34 acts as a buffer reservoir in a by-pass mode is absent in the present system. The unit 34 includes a device 36 for inserting full trays 16 onto the conveyor 18, and a device 38 for removing full trays from the region of tray unloader 20; these devices may be substantially similar to those disclosed in said specification No. 2171971.

The details of the unit 34 may be substantially similar to any of the buffer reservoirs and associated conveyors disclosed in the above-mentioned British Patent specifications Nos. 2142894, 2157252, 2157253 and 2171971, to which reference is directed. The unit 34 constitutes a delay line and reservoir for filter rods produced by the filter rod making machine 10.

The tray filler 14 includes a coding device 40 which is programmed or otherwise supplied with data to enable it to apply a code to each tray which is loaded. The code records the brand type and time (which may be time of loading or derived time of manufacture of contents). Each full tray 16 delivered to the conveyor 18 passes a code reading device 42 before being elevated into the tray unloader 20. The device 42 is programmed or otherwise arranged to accept only those trays 16 with codes which indicate the correct brand of filter rod and also which indicate a time of loading (or manufacture) which is sufficiently early for adequate curing of the filter rods. Typically the delay between coded time and actual time at the reading device 42 should be such as to allow at least 20 minutes curing between manufacture at the machine 10 and delivery to the unit 24. If the delay is not yet sufficient, elevation into the tray unloader 20 and subsequent unloading is delayed until sufficient time has elapsed. If the brand is incorrect then the tray may be rejected via the device 38, and/or an alarm may be sounded to call an operator to remove the tray (either from the device 36 or the device 38) and/or the device 36 may be rendered inoperative until the tray is removed from the device.

The code writing and reading devices 40, 42 are under control of electronic circuit means 44, including a programmable device such as a microprocessor, having means for generating a clock signal which may be used by the write device 40 and also means for comparing a code read at the device 42 with the current clock signal. Coding of the trays may be by way of magnetic strips, transponders, or other suitable means carried by the trays. Such means is shown at 17 in FIG. 1.

The length of the conveyor 18 determines the maximum number of trays which may be accommodated. This also depends on the length of the filter rods. Typically 25 trays of 100 mm filter rods may be accommodated. A length corresponding to six trays may be reserved for reservoir capacity, so that a queue of 19 trays is normally present on the conveyor 18 forming part of the delay line. Assuming also that at least one full tray is present in the tray filler 14 and at least three full trays are at various positions in the tray unloader 20, the total delay line in trays comprises 23 trays. This corresponds to 92,000 filter rods. The conveyor paths 12 and 22 hold about 30,000 filter rods, so that the total delay line contains about 122,000 rods. At current speeds of 400 metres and 4,000 cuts per minute this represents a delay of about 30 minutes. Even at future projected speeds of 600 metres and 6,000 cuts per minute the delay would still exceed 20 minutes.

Figure 3:
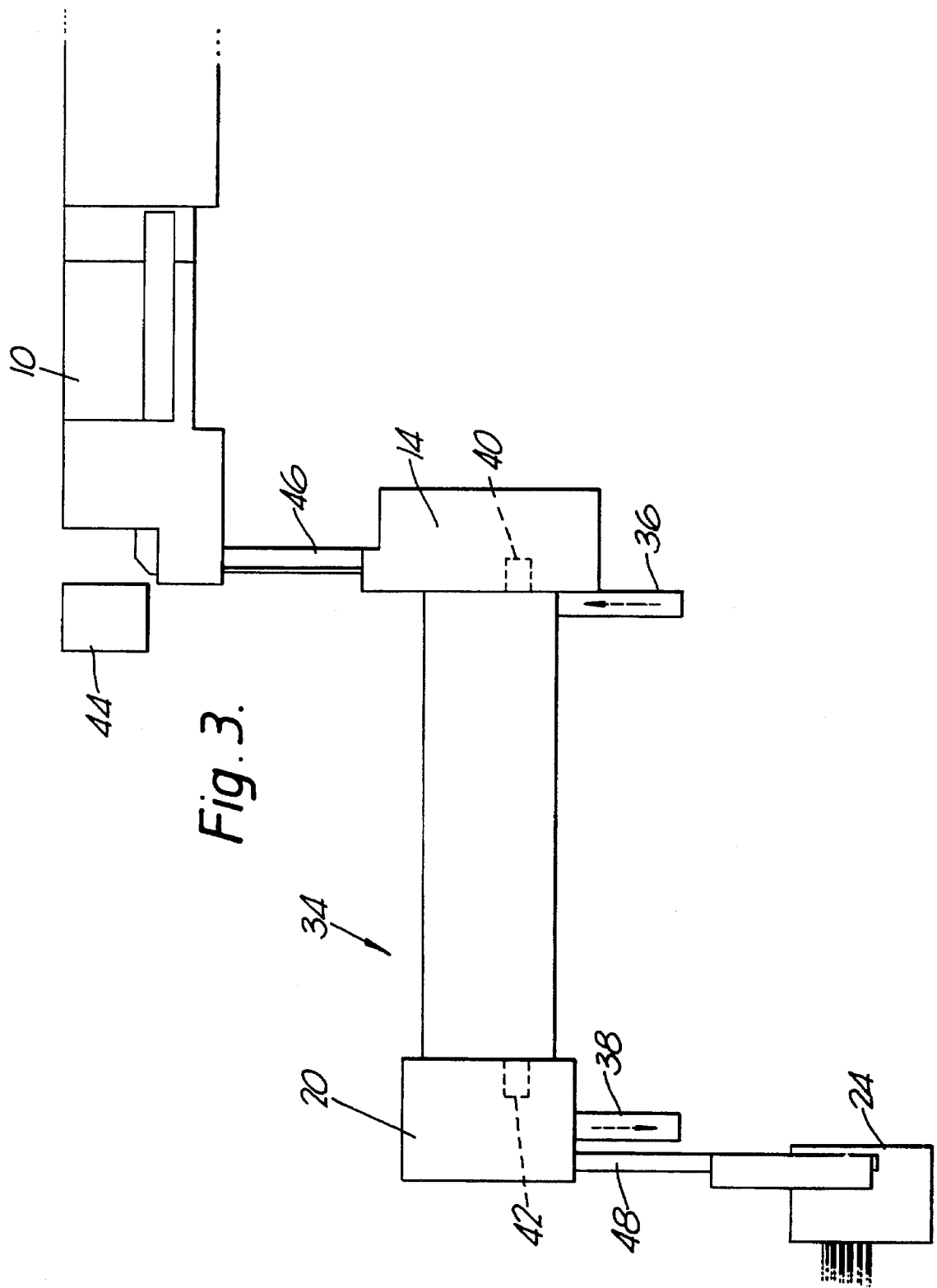
FIG. 3 is a plan view of another conveyor system for filter rods.

An alternative system is shown in FIG. 3. This operates in the same way as that of FIGS. 1 and 2 but has a shorter first conveyor path 46 and a shorter second conveyor path 48. The system of FIGS. 1 and 2 may have an advantage that it may be converted for use of cigarettes somewhat more readily than that of FIG. 3, e.g. by provision of a conveyor section 32 and appropriate reprogramming of the control unit including the circuit means 44. Certain additional sensors, notably at the junctions formed by insertion of the section 32 would also be required.

Note that both systems have the advantage that filter rods are automatically and necessarily loaded into trays. Thus, if it is required to deliver filter rods by way of trays to some filter cigarette assembling machines, particularly those machines in the vicinity of the system, the unit 34 may be arranged so that full trays may be removed by the device 38 for supplying those machines. Particularly if operation in this mode is contemplated, the trays used should have a provision for insertion of slats at their tops.

Code writing devices may be provided at or adjacent tray fillers independently associated with cigarette or filter making machines. Similarly code reading devices may be provided at or adjacent tray unloaders independently associated with filter rod assembling machines or cigarette packing machines or pneumatic filter rod distributing stations.

Further code writing and/or reading devices may be provided in one or more stand-alone units which may be located as required to provide a facility for use with existing systems lacking the present facilities of the invention. Such stand-alone units may be readily portable.

Figure 4:
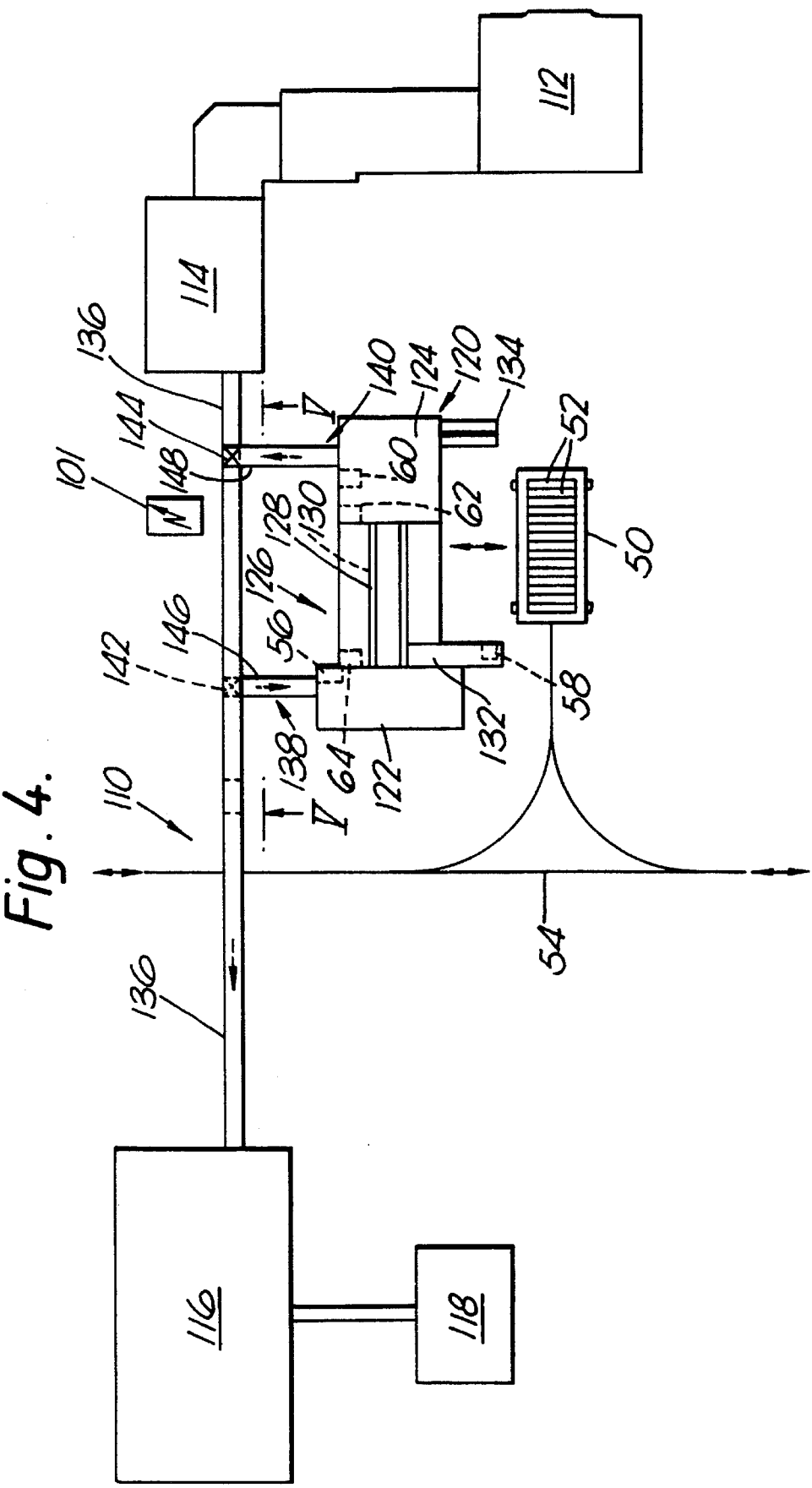
FIG. 4 is a plan view of a cigarette making complex.

In FIG. 4 a cigarette conveying system 110 links a cigarette making machine 112 and filter cigarette assembling machine 114 to a cigarette packing machine 116 and packet wrapping machine 118. The system 110 includes a tray buffer reservoir unit 120. The unit 120 comprises a tray filler 122 and tray unloader 124 with a tray transport system 126 linking the tray filler and tray unloader. The system 126 includes a conveyor 128 for moving empty trays from the tray unloader 124 to the tray filler 122, and a conveyor 130 (beneath the conveyor 128) for moving full trays from the tray filler to the tray unloader. The system 126 further includes a device 132 for introducing full trays onto the conveyor 130 and a device 134 for removing full trays from the region of the tray unloader 124. The tray transport system 126 is generally similar to that disclosed in British patent specification No. 2171971.

Figure 5:
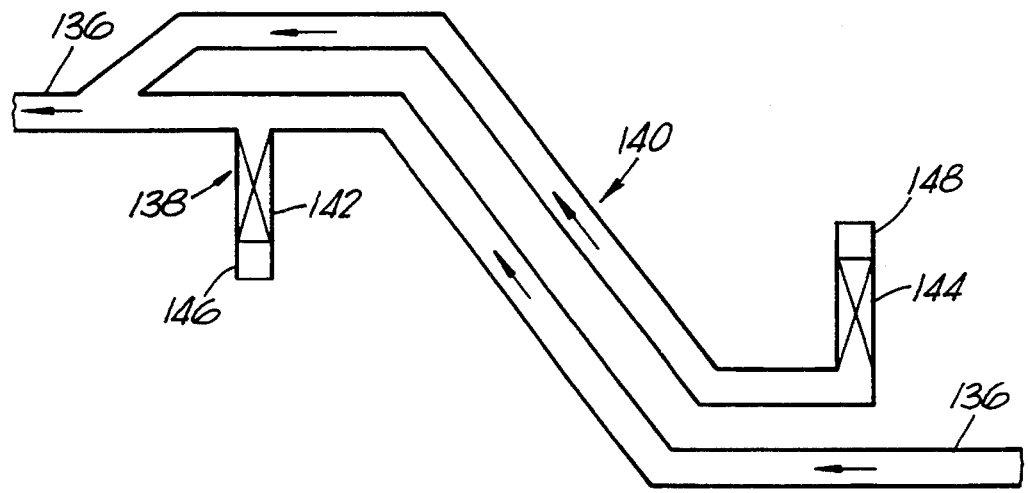
FIG. 5 is a sectional view on the line V—V in FIG. 4.

Referring also to FIG. 5, the system 110 includes a main conveyor 136, on which cigarettes in mass flow stack formation are moved from the assembling machine 114 towards the packing machine 116. Subsidiary conveyors 138, 140 extend respectively between the main conveyor 136 and the tray filler 122 and tray unloader 124. Each of the conveyors 138, 140 includes twisted down-drops 142, 144 and generally horizontal portions 146, 148 at right angles to the conveyor 136.

The cigarette conveying part of the conveyor system 110 is generally similar in construction and operation to that of British patent specification No. 2157252, to which reference is directed for details. The reservoir unit 120 is similar in function to the reservoir units disclosed in British patent specification No. 2142894, particularly the embodiment of FIGS. 12–16, and British Patent specification No. 2171971, to which specifications reference is directed for details. The tray filler 122 and tray unloader 124 may be similar in operation to those described with reference to said FIGS. 12–16.

Referring to FIG. 4, full and empty trays may be transferred between the unit 120 and other similar units or other tray fillers and/or tray unloaders by way of a trolley 50 capable of holding a number of trays 52 and being movable on a path 54. In order to ensure that only the correct trays containing the correct product are introduced to the unit 120 a tray security system is incorporated. This provides that each tray carries a magnetic strip or transponder in a location which is convenient for interaction with read, write, and erase heads which are provided at appropriate positions at the unit 120. The magnetic strip or transponder can be coded on four positions or lines or channels as follows:

| Line | Code | No of Variables |
| --- | --- | --- |
| 1 | Tray size and type (permanent code) | 10 |
| 2 | Cigarettes or Filters | 2 |
| 3 | Cigarette size and brand name or Filter size, type and denier of tow | 100 |
| 4 | Other variables | 10 |

Line 1 is a permanent code. Lines 2, 3, and 4 are appropriately coded by a write head 56 at the exit of the tray filler 122 (ie on delivery of a full tray onto the conveyor 130). There may be provision for operator intervention to cause the write head 56 to apply a reject code to a tray (e.g. the operator may notice a partly or incorrectly filled tray). A read head 58 is positioned at the full tray entry position 132 and a further read head 60 is positioned at the entry to the tray unloader 124. The further read head 60 provides additional security in the event of an operator by-passing the normal entry device 32 and, for example, placing an incorrect tray on the conveyor 130. The read heads 58 and 60 are programmed to give a reject and/or alarm signal in the event of an incorrectly coded (including uncoded) tray being read. In the case of the read head 58, associated with the full tray entry device 132, an operator may withdraw an incorrectly coded tray from the device following a signal activated by the read head, and/or the device 132 may be rendered inoperative until the incorrectly coded tray is removed. Information concerning such an incorrect tray or the reading of the code itself may be used to cause the tray to be passed to and ejected by the full tray removal device 134. Trays with a reject code applied by the write head 56 may be automatically directed to the removal device 134.

On exit from the tray unloader 124 empty trays are decoded (at lines 2, 3 and 4) by a write or erase head 62. This allows flexibility in use of empty trays. A read head 64 (for empty trays) is located at the entry to the tray filler 122. The presence of the tray type coding in line 1 ensures the correct tray is being used. Correct presentation of a tray to or in the unit 120 is checked by presence of a line 1 code (i.e. if no line 1 code is read by either of the heads 58 or 60 the tray will be rejected).

The read and write (and/or erase) heads 56, 58, 60, 62 and 64 may be connected to and programmed by a central computer.

When using trolleys 50 to deliver trays 52 along path 54 or other similar paths the trays 52 may be obtained from other units similar to the unit 120 or may be obtained from separate tray fillers or tray unloaders. It is therefore desirable that separate, stand-alone tray fillers are provided with write heads and separate stand-alone tray unloaders provided with read and erase (write) heads. In the case of delivery of filter rods by means of trays to a filter assembling machine the tray unloader at the filter assembling machine should also be provided with read and erase heads.

In order to allow use of wrongly coded or uncoded trays in exceptional circumstances (e.g. during servicing or testing) a manual tray coder or decoder and/or a manual override facility may be provided for the unit 120.

Each conveyor 128, 130 of the unit 120 may hold up to about 20 trays. With standard size trays (holding 4,000 cigarettes) the maximum capacity of the unit 120 is therefore 80,000 cigarettes. By providing for transfer of full (and empty) trays from a trolley 50 it is possible effectively to increase the capacity of unit 120 directly by the capacity of the trolley, and indefinitely by replacement of the trolley. An automatic system for transferring trays between the unit 120 and a trolley 50 is shown in FIGS. 6 and 7, where parts similar to parts shown in FIG. 4 have been given similar reference numbers.

Movement of trays between the trolley 50 and the unit 120 is effected by a robotic tray gripper 70 movable on three (x, y, z) axes on a gantry system 72. The gripper 70 comprises pivoted arms 74 and a control/motor unit 76 mounted on a vertical support 78. A further control/motor unit 80 including a suitable drive connection with the support 78 is movably mounted on a cross-beam 82. The unit 80 allows and provides rotational movement of the gripper 70 by rotation about the longitudinal axis of support 78. Further motor units 84 at each end of the cross-beam 82 are capable of movement together along parallel gantry girders 86. It may be seen, therefore, that the gripper 70 is movable along an x-axis direction by movement of the units 84 along the girders 86, in a y-axis direction by movement of the unit 80 along the beam 82, and in a z-axis direction by a substantially vertical movement of the support 78 under separate action of the motor unit 80. Rotation about a vertical axis is provided by further action of the unit 80. The unit 76 controls operation of the arms 74, and also limited pivotal movement (about an axis parallel to the y-axis as shown).

Figure 6:
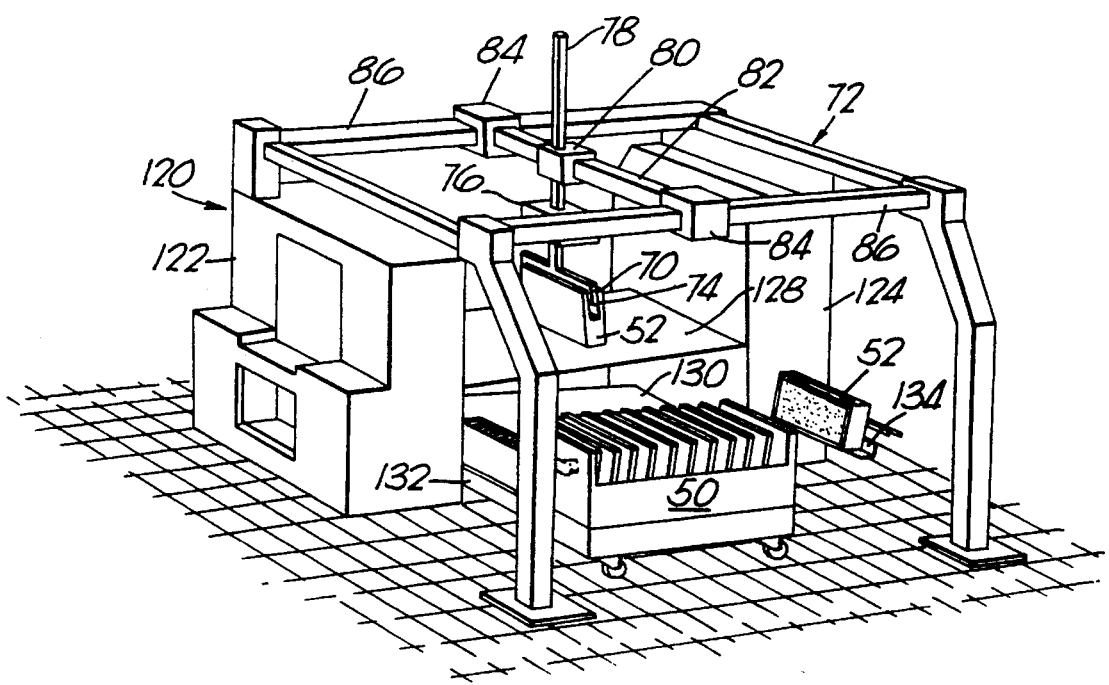
FIG. 6 is a perspective view of a tray handling system.
Figure 7:
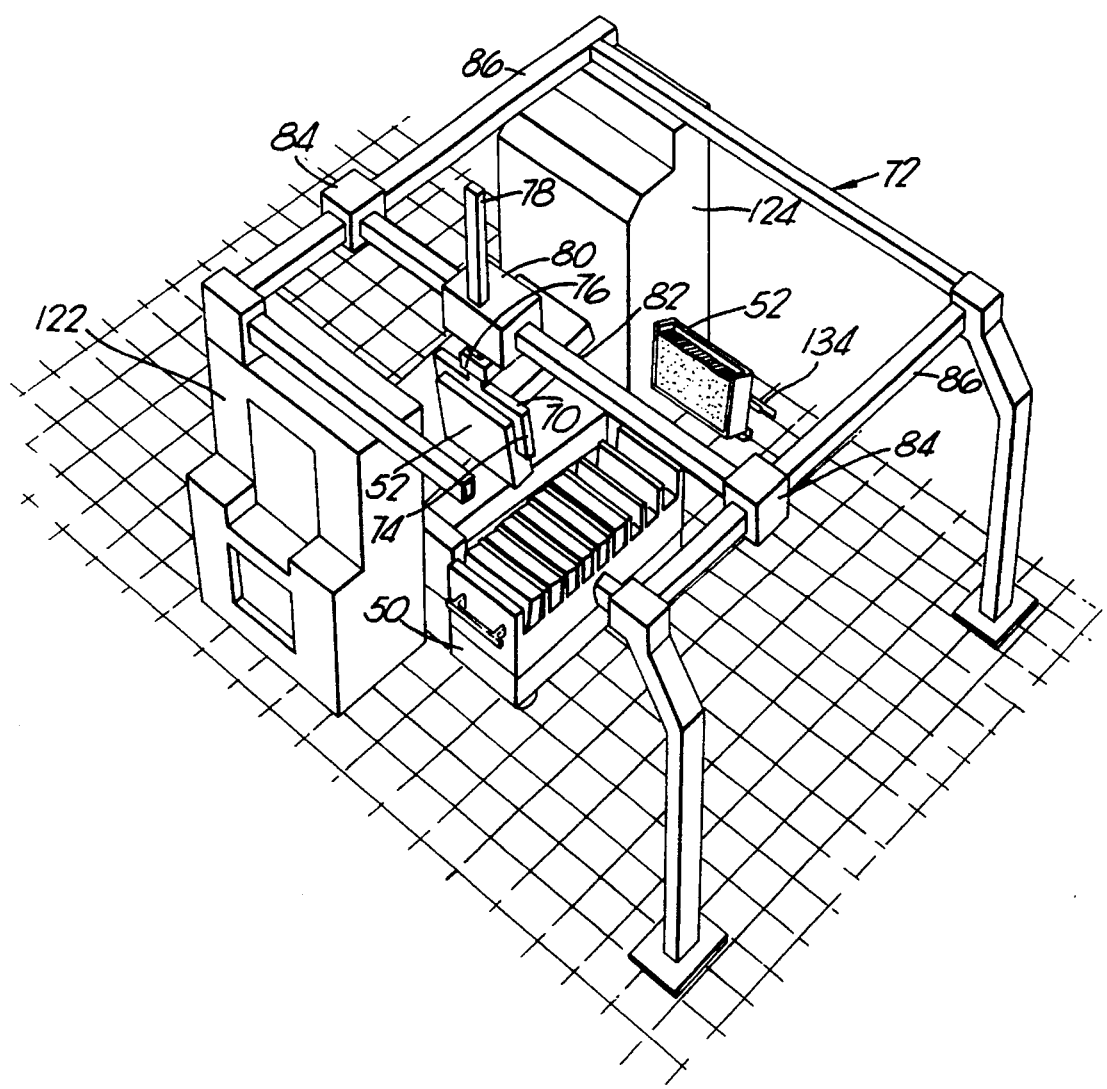
FIG. 7 is a further perspective view of the system of FIG. 6.
Figure 8:
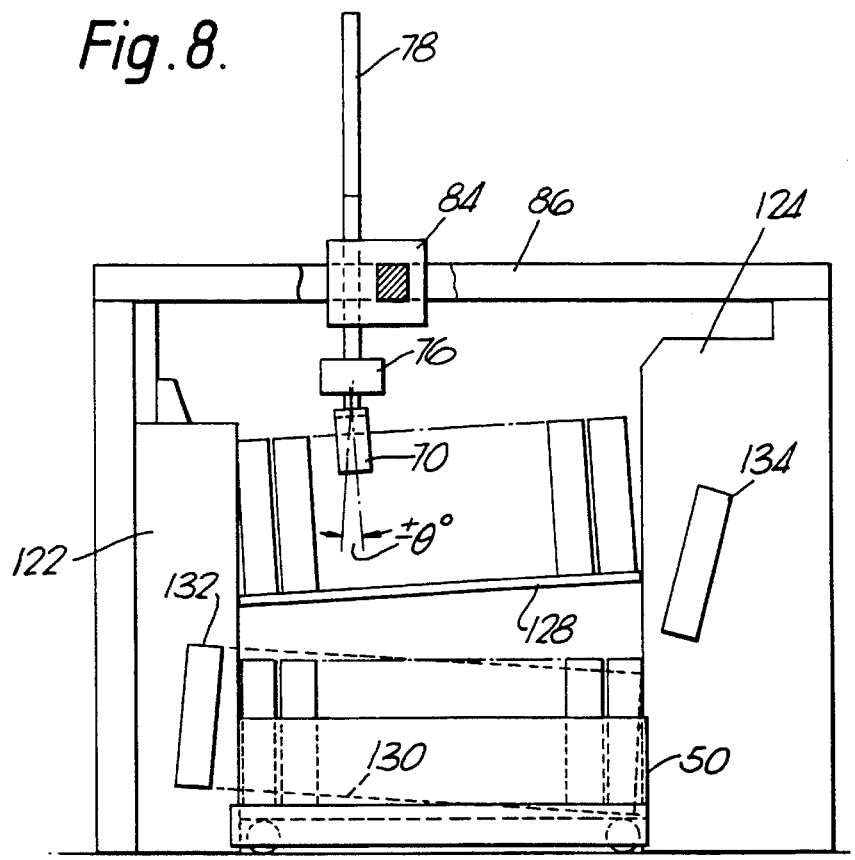
FIG. 8 is a side view of the system of FIG. 6.
Figure 9:
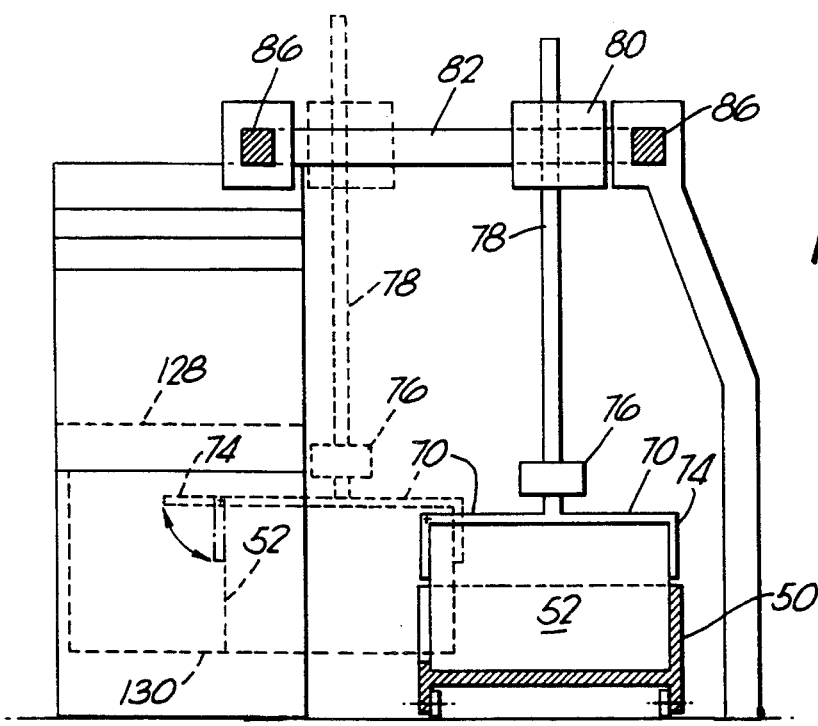
FIG. 9 is an end view of the system of FIG. 6.

FIGS. 8 and 9 show further details of the system of FIGS. 6 and 7. In FIG. 8 the gripper 70 is at the level of the empty tray conveyor 128. In FIG. 9 the gripper 70 is at the level of the trolley 50 in its full line position and at the level of the full tray conveyor 30 in its dotted line position.

The gripper 70 is provided with appropriate sensors common to robotic systems to allow it to detect the presence of a tray within a range of expected positions, adjust its own position to one appropriate to the actual position of the tray, and subsequently to grip the tray with a force sufficient to reliably lift the tray without damage and place it in a known location. Since the unit 120 is static the main variable is in the position of the trolley 50. This may be located sufficiently accurately by detents or even merely marks on the floor (so that manual positioning is possible). The gripper 70 may have a device for reading coded information (e.g. stored by a transponder) so as to enable it to distinguish between full and empty trays.

One feature of the system is that the trolley 50 is static. The gripper 70 and accompanying robotic sensors allow operation within a relatively wide range of possible trolley positions (so avoiding absolute precision in location of the trolley). The space required to be set aside for a trolley in a transfer position is therefore considerably less than where the trolley is necessarily indexed past fixed loading or unloading positions, as in prior art arrangements.

FIG. 9 shows that the gripper 70 can reach a certain distance onto the full tray conveyor 130. One of the gripper arms 74 can then be raised, as shown in the dotted line position, and the gripper 70 subsequently withdrawn by generally horizontal movement. Finally the tray 52 may be pushed completely onto the conveyor 130 by lowering the gripper 70 slightly and pushing the tray with the still extended arm 74. Such movement would normally be carried out at the full tray introducing device 132. By providing a separate automatic sideways feed conveyor for the device 132, so that the gripper 70 is required merely to deposit the tray onto the device 132 and not provide further sideways movement of the tray onto the conveyor 130, the gripper 70 is able to make a further trip to the trolley 50 while the previous tray is being deposited on the conveyor 130.

As noted, normally the gripper 70 will deliver full trays in the region of the device 132 and receive full trays in the region of the device 134. Empty trays may be received and deposited directly on the conveyor 128 (where access is easier), appropriate optical or other sensors being provided on the gripper 70 to detect the presence of an empty tray or a space depending on whether it is transferring from or to the conveyor 128.

Normally as full trays are removed from the unit 120 empty trays will be delivered (and vice versa), and the operating system of the control unit for the system of FIGS. 6–9 will be programmed accordingly.

As indicated in FIG. 8, the conveyor 128 is inclined downwardly (at approximately one and a half degrees) and the conveyor 130 is also angled downwardly (at approximately three degrees). The full tray introducing device 132 is inclined at the same angle as the conveyor 130. The full tray delivery device 134 is inclined more than the conveyor 130, so that trays are inclined at about 20 degrees to the vertical. The gripper 70 is pivotable about the y-axis so as to be able to adapt to any possible inclination of empty or full trays in the unit 120. Trays may be inclined in the trolley 50, by up to 20 degrees, so that the cigarettes are retained in full trays if vibration occurs when the trolley 50 is moved.

Each trolley 50 may comprise a tray frame and a manually propelled vehicle. The tray frame may also be carried by an automatically guided vehicle (AGV). Thus an AGV may be moved between units 120 along a path 54.

In order to assist operators when using manually propelled trolleys, an information system giving delivery instructions may be provided at each unit 120. Thus, an alpha numeric display panel may be provided to instruct an operator to take a full trolley to another (named) unit 120 or to a store.

Each of the trolleys 50 preferably contains about 15 trays. Instead of a single tier trolley a two tier trolley may be provided with an upper level for empty trays and a lower level for full trays. However, this makes operation of a robotic system using a gripper similar to the gripper 70 rather more complex.

The gripper 70 need not actually grip trays. It may engage with appropriate elements, e.g. ledges or ribs, provided on the trays for this purpose. Such elements, if added to conventional trays, are preferably such as not to interfere with operation of the trays on conventional tray handling machines, so that transfer of trays between the unit 120 and those machines is still possible.

Instead of providing that each tray should carry detailed coding information it is possible to arrange that each tray carries just sufficient information to identify it or its position uniquely. Such information can then be used to identify further information relating to the tray, such further information being held in a memory, e.g. of a microprocessor. For example, each tray may carry a transponder which transmits (on interrogation) a signal which merely identfies the tray. This signal is stored in a memory location corresponding to the position at which the signal was last received. Thus a tray which has just been filled with articles at a particular tray filler is identified as such in the memory of a microprocessor and when it is subsequently moved to a tray unloader for unloading a read head at the unloader passes a signal to the microprocessor which again identifies the tray. Only if the information stored in the microprocessor memory relating to the previous status of the tray corresponds with the programmed requirements for unloading of the tray (e.g. correct contents for the unloader, or adequate elapsed curing time) will the microprocessor control sequence continue and allow the tray to be unloaded.

In the systems of FIGS. 1 to 3 the writing device 40 corresponds to the write head 56 in the systems of FIGS. 4 to 9; similarly the reading device 42 corresponds to the read head 60. Devices corresponding to the write head 62 and read heads 58 and 64 may be provided in the systems of FIGS. 1 to 3 and used in a substantially analagous way to that described with reference to FIGS. 4 to 9. Such devices are respectively indicated at 162, 158, and 164 in FIGS. 1 and 2.

A modified system for coding tray data is as follows:

| Data | Variables | Hex Digits |
| --- | --- | --- |
| Tray size and type | 15 | 1 |
| Cigarette or Filter | 2 | 1 |
| Cigarette size and brand or | 99 | 2 |
| Filter size, type, tow denier | | |
| Identity of making machine | 99 | 2 |
| Date & time of code writing | Month, day, hours, minutes | 8 |
| Other | | 1 |
| | | 15 |

The system may be arranged for input and output of codes via a processor in which stored codes are linked to alphanumeric codes, e.g. for brands, already used by a user; such linking may be by way of look-up tables held in memory locations accessible by the processor. This is convenient in that the user may already be familiar with his own alphanumeric codes for brands and other data to be stored.

Where the device carrying the coded information is a transponder this may be a robust industrial grade proprietary unit encapsulated in a plastics case. One currently available unit has dimensions 64×43×10 mm. This may be fixed to the outer side wall of a tray, and in a currently preferred arrangement the fixing position is approximately 100 mm above the base on the side which passes the read/write devices on conveyors 18 and 30 in FIG. 2.

Transponders may be coded by low frequency transmission. Typically the transponder may comprise a so-called tag having tuned circuits for transmitting and receiving. Typical transmitting and receiving frequencies are 132 kHz and 66 kHz respectively. Also incorporated within the transponder may be a primary battery (e.g. lithium cell) and a microchip having some RAM. The write/read heads may thus comprise transmitters/receivers each having a local microprocessor controlled interface unit for encoding purposes. The transmission and receiving range of the transponder and the read and write devices need only be relatively short, e.g. 100 mm, and is preferably polarised and relatively directional: this is helpful in avoiding interference and incorrect readings.

The data to be encoded is determined by a central microprocessor (e.g. unit 44 in FIGS. 2 and 3 and unit 101 in FIG. 4) and communicated to each of the local microprocessors via the interface units. An operator's control panel may be used to input data to the control microprocessor. This may have a limited alphanumeric input panel and a display panel which can indicate at least whether a read/write operation has been successfully completed and, preferably, the status of the predetermined information, the location and nature of any reading which does not correspond with the expected predetermined information, and a read-out of codes being input (preferably with input prompts such as a menu).

The central microprocessor (which may also control other functions relating to the container reservoir unit) may include a communications port linked to a central computer for the factory. In normal circumstances data will be supplied to each central microprocessor direct from the central computer and this will take precedence over any data entered in the local operator's control panel unless such precedence is overridden. Access to any such overriding facility is limited.

We claim:

1. A conveying system for containers for rod-like articles of the tobacco industry, comprising means for loading containers with rod-like articles, means for unloading containers, first conveyor means for conveying a container for rod-like articles along a first path, second conveyor means for conveying a container for rod-like articles at least partly along a second path between said loading and unloading means, and means for transferring a container between a plurality of positions of said first conveyor means and at least one position of said second conveyor means, the transferring means including a container engaging member movable along said first path to said plurality of positions.

2. A system as claimed in claim 1, wherein the container engaging member is movable to a plurality of positions of said second conveyor means.

3. A system as claimed in claim 1, wherein the container engaging member comprises container sensing means.

4. A system as claimed in claim 1, wherein the transferring means comprises a robotic or other programmable member.

5. A system as claimed in claim 1, wherein the transferring means includes means for moving the container engaging member so that any position in a particular space which is normally accessible by a container on said first or second conveyor means may be reached by the member.

6. A system as claimed in claim 5, wherein the container engaging member is movable in at least two directions at right angles to each other.

7. A system as claim in claim 6, wherein the container engaging member is rotatable about at least one axis.

8. A system as claimed in claim 1, wherein the first conveyor means comprises a conveyance.

9. A system as claimed in claim 8, wherein the transferring means is arranged to transfer empty or full containers between the conveyance and the second conveyor means.

10. A system as claim in claim 1, wherein said second conveyor means includes endless band conveyor means linking the container loading means and the conveyor unloading means.

11. A system as claimed in claim 1, further including means for distinguishing between full and empty containers.

12. A container conveying system for rod-like articles of the tobacco industry, comprising means for loading containers with rod-like articles, means for unloading containers, first conveyor means for a container for rod-like articles, second conveyor means for a container for rod-like articles, at least said second conveyor means extending at least partly along a path for containers between said loading and unloading means, and means for transferring a container between a plurality of positions of said first conveyor means and at least one position of said second conveyor means, the transferring means including a container engaging member movable to said positions, wherein the container engaging member carries a device for receiving coded information from a container or its contents.

13. A system as claimed in claim 12, wherein the transferring means is arranged to place containers in different locations according to said information.

14. A conveying system for rod-like articles of the tobacco industry, comprising an article delivery device, an article receiving device, first conveying means for conveying articles from the article delivery device to a container loading station, second conveyor means for conveying articles from a container unloading station to the article receiving device, container conveying means for conveying containers containing articles from said loading station to said unloading station, and control means for determining the conveyance rate of said container conveying means, whereby articles pass from said delivery device to said receiving device in a predetermined minimum time, wherein the control means includes means for delaying passage of containers, where necessary, to ensure a minimum elapsed time between manufacture and delivery, wherein said delaying means includes means for retarding conveyance of containers by said second conveyor means.

15. A system as claimed in claim 14, wherein the control means is arranged to monitor the movement of containers through known locations in association with a generated time signal to ensure that said predetermined minimum time has elapsed.

16. A system as claimed in claim 14, wherein the control means includes means for recording time or other information related to time of manufacture or loading of articles in a container.

17. A conveyor system for rod-like articles of the tobacco industry, comprising an article delivery device, an article receiving device, first conveying means for conveying articles from the article delivery device to a container loading station, second conveyor means for conveying articles from a container unloading station to the article receiving device, container conveying means for conveying containers containing articles from said loading station to said unloading station, and control means for determining the conveyance rate of said container conveying means, whereby articles pass from said delivery device to said receiving device in a predetermined minimum time, wherein the control means includes means for delaying passage of containers, where necessary, to ensure a minimum elapsed time between manufacture and delivery, means for recording time or other information related to time of manufacture or loading of articles in a container, and a write unit for coding each container at or adjacent the loading station.

18. A system as claimed in claim 17, wherein the control means includes a read unit at or adjacent the unloading station.

19. A system as claimed in claim 18, wherein the read unit includes or is linked to means for comparing a code carried by a container with a signal related to current time.

20. A system as claimed in claim 19, wherein the control means further includes means for delaying a container until an acceptable result is achieved by the comparing means.

21. A conveyor system for rod-like articles of the tobacco industry, comprising an article delivery device, an article receiving device, first conveying means for conveying articles from the article delivery device to a container loading station, second conveyor means for conveying articles from a container unloading station to the article receiving device, container conveying means for conveying containers containing articles from said loading station to said unloading station, and control means for determining the conveyance rate of said container conveying means, whereby articles pass from said delivery device to said receiving device in a predetermined minimum time, wherein the control means includes means for delaying passage of containers, where necessary, to ensure a minimum elapsed time between manufacture and delivery, and wherein the control means is programmable so that an acceptable delay may be stored in memory.

22. A conveyor system for rod-like articles of the tobacco industry, comprising an article delivery device, an article receiving device, first conveying means for conveying articles from the article delivery device to a container loading station, second conveyor means for conveying articles from a container unloading station to the article receiving device, container conveying means for conveying containers containing articles from said loading station to said unloading station, and control means for determining the conveyance rate of said container conveying means, whereby articles pass from said delivery device to said receiving device in a predetermined minimum time, wherein the control means includes means for delaying passage of containers, where necessary, to ensure a minimum elapsed time between manufacture and delivery, and wherein the container conveying means includes means for storing and conveying containers at a rate appropriate to said predetermine minimum time, and means for storing and conveying additional containers.

* * * * *